April 25, 1944. H. L. DICK ET AL 2,347,184
FILTERING DEVICE OR THE LIKE
Filed Nov. 9, 1935
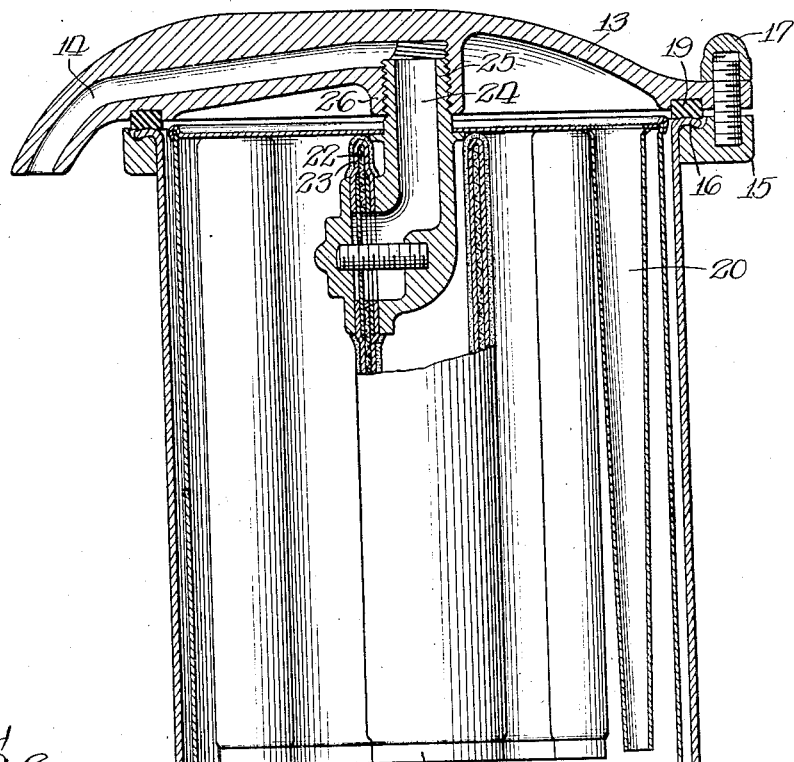
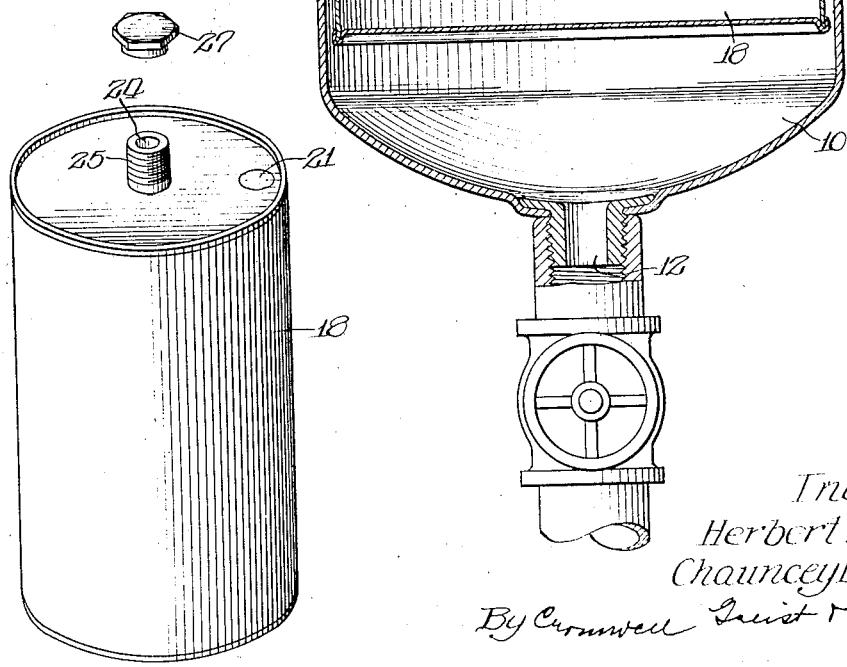
Inventors:
Herbert L. Dick,
Chauncey B. Oliver,
By Cromwell Greist Warden
Attys.

Patented Apr. 25, 1944

2,347,184

UNITED STATES PATENT OFFICE 2,347,184

FILTERING DEVICE OR THE LIKE

Herbert L. Dick and Chauncey B. Oliver, Chicago, Ill., assignors to Tested Appliance Company, Chicago, Ill., a corporation of Nevada Application November 9, 1935, Serial No. 49,086
Renewed February 2, 1939

3 Claims. (Cl. 210—131)

The present invention relates to a filtering device or the like and has particular reference to a refill cartridge for use therein.

In the use of various filters today it is customary to employ a container that is of sufficient strength to hold not only the filter bed and medium but also to withstand the varying pressures placed upon the container by the source of supply of the liquid to be filtered. The filter charge is placed directly within this shell and the filter medium is likewise placed therein. After a time of service it is necessary to replace the filter bed and the filter medium or to clean or wash and rejuvenate the same because of the collection or adsorption of impurities therethrough. For cleaning purposes the whole filter is removed or tipped and the contents scraped or dug out making an unpleasant and troublesome act of the cleaning and recharging. Time is expended in cleaning the filter container, removing the old filter bed, inserting a new charge and in otherwise preparing the filter for renewed operation. In some instances the time element is reduced by replacing the old filter with an entirely new filter but this means additional expense in providing a whole new filter and added trouble in disconnecting the old and attaching the new filter.

In household installations for the purification of drinking water where cleanliness is an item to the housewife, the difficulty of removing the filter bed and the messy results from attempting to change the filter charge react unfavorably to the sales of filters of this type for household use.

A principal object of this invention is to provide an improved filtering or purifying device, or both, that is durable, inexpensive to operate, simple to manufacture and easy to clean or rejuvenate.

Another object of this invention is to provide, as an article of manufacture, a filter bed and medium that may be disposed of and renewed as an entity when necessary.

A further object of my invention is to provide an inexpensive container or envelope enclosing the filter bed or the medium, or both, the whole of which may be removed from the filter when it has served its purpose.

A still further object of my invention is to provide, in a filter having a permanent pressure-withstanding container, a renewable filter bed.

Still other and further objects of my invention will be pointed out or indicated hereinafter or will be apparent to one skilled in the art upon an understanding of the invention or its employment in practice.

In the accompanying drawing:

Fig. 1 is a sectional view through a filter showing a refill cartridge mounted therein;

Fig. 2 is a perspective view of a separate refill cartridge.

It will be recognized that the improved filter device is of general application, but, for purposes of illustration and explanation, it will be described with reference to the purification of water for household purposes and more particularly with reference to that structure shown and described in the application of Herbert L. Dick, Serial No. 616,381, filed June 10, 1932, now Patent No. 2,081,353, issued May 25, 1937.

In one embodiment of this invention as shown, a sealed envelope or container is formed to fit within the pressure shell or container. Within the sealed envelope is disposed all of the filtering charge for action upon the liquid to be treated together with the filter medium. Liquid communication is established between the inlet conduit bringing liquid to be treated into the filter shell and the filter charge by forming a removable inlet portion to the sealed envelope preferably above the filter charge line. In order to remove purified liquid from the filter through the usual filter outlet conduit, a removable outlet portion is formed in the sealed envelope and a liquid communication is established between the outlet side of the filter medium to the outlet conduit of the filter container therethrough.

As the liquid to be purified is normally under pressure from the source of supply, the outer or filter container is of sufficient strength to withstand the pressures exerted thereby. The envelope, however, may be of extremely light, inexpensive and non-pressure-withstanding material as both sides of its walls are filled with liquid and equal pressures are therefore met by the envelope walls. The envelope should be of sufficient strength to support the filter charge and to remove the same from the filter shell upon removal of the envelope. By this structure the filtering operation remains as efficient as before, time is saved, and energy in cleansing the filter shell is conserved as the envelope containing the filter charge and collected impurities is removed from the filter shell as a unit.

As shown in the drawing, the filter includes an outer filter shell or container 10 having an inlet conduit 12 and an outlet conduit 14 which may be located in the cover 13. The cover 13 may be attached to the shell 10 by means of the ring member 15 secured beneath the shell flange 16. Studs 17 are inserted through the cover 13 and the ring member 15 and nuts are attached holding the cover securely in place. A washer member 19 may be inserted between the flange member 16 and the cover 13 to insure a liquid-tight connection. This outer shell is of sufficient strength to withstand varying pressures in the liquid supply whether the filter be of the pressure or vacuum type.

To overcome the objectionable features of present day filters we insert within the outer shell 10 an envelope or refill cartridge 18 having liquid communication with both the inlet conduit 12 and the outlet conduit 14. The filter charge, varying according to the type of filter, the liquid used and the results to be accomplished, is placed within the envelope 18. For household water filters such as shown in the drawing, finely divided particles of activated carbon aided by prepared diatomaceous earth may be mixed with water and used. While the envelope is preferably of sufficient strength to support the filter charge, it need not be a pressure-withstanding envelope such as the outer shell 10. The body of the envelope may be made of a material, the porosity of which is sufficient to retain the filter charge therein. In some instances, such as the present embodiment, where a fine comminuted substance in water is used for the filter charge a metal envelope is preferable. In the drawing, envelope 18 is made of corrosive-resisting alloy which performs well not only in the filtering operation but serves as a shipping and selling container.

Envelope 18 is provided with an inlet tube 20 that may terminate adjacent the bottom of the member 18 so that incoming liquid will stir up any of the filter charge settling upon the bottom. The inlet end of the tube 20 is attached to a wall of the envelope above the level of the filter charge. This location is preferable to prevent the filter charge from spilling in handling before use, and helps to prevent back-up into the filter shell 10. The inlet end of tube 20 may be sealed in any well known manner, but, for the purposes of the present disclosure, the body of the envelope itself is scored as at 21 to form a weakened portion therein. This weakened or removable portion should be of sufficient strength to seal the opening until the envelope is to be used. When needed for filtering purposes the weakened portion is punched out or otherwise dislodged and the water entering container 10 may flow upwardly around envelope 18 and downwardly therein through the tube 20.

Also disposed within envelope 18 is the filtering medium 28. In the present embodiment the filter medium comprises a wire screen 22, covered by, or sealed within, a filter cloth 23 and bent to form a tortuous shape, thereby presenting a greater filter area for the liquid to be treated. From between the walls of the filter medium extends an outlet tube 24 for the treated or filtered liquid. This tube is likewise kept in a sealed condition until the envelope and its contacts are ready for use, at which time the seal is dislodged and the outlet tube connected to outlet conduit 14. In the drawing, outlet tube 24 is shown extending above the top of envelope 18 and threaded upon the end 25 thereof. This threaded portion cooperates wiht the threaded inner end portion 26 of conduit 14 to form a water-tight connection and to support the envelope within the container 10. With this embodiment, a cap seal 27, forming a second removable portion in the envelope, may be used to seal outlet tube 24 when envelope 18 is not in use.

It will be seen that envelope 18 comprises a separate entity forming a sealed refill cartridge that may be shipped or conveniently handled. It includes the filter charge and filter medium therein. When needed for use the inlet and outlet tubes are unsealed and the outlet tube is connected to the outlet conduit of a filter. The old refill cartridge is removed and disposed of in any way. As the cost of the envelope itself is small this means little added expense to the cost of the normal filter charge. There is much less expense than if the entire filter with its pressure-resistant wall were destroyed and replaced as is customary in some filters today. If a liquid-tight envelope is used, after the filter charge and medium are inserted, the envelope may be substantially filled with some of the liquid to be treated. Before placing the envelope in the filter it may be subjected to a shaking to insure a proper suspension of the filter charge in the liquid and for assisting in the filtering operation.

Many variations of this invention will occur to one skilled in the art and such modifications as come within the spirit of the invention are intended to be included in the appended claims.

We claim:

1. A refill cartridge comprising a shippable, sealed container, a filter charge adapted to be a wet charge in operation, and a filter medium disposed within said container, an inlet tube mounted to the wall of said container in the upper portion thereof, a removable seal closing the inlet tube, a communication being established to the filter charge in said container upon removal of said seal, an outlet leading from said filter medium through the top of said container, a removable seal closing the outlet of said container, said outlet being adapted for detachable connection within a pressure filter shell.

2. A refill cartridge for use in a filter having a pressure shell and inlet and outlet conduits therefor, comprising a closed container, a filter medium disposed within said envelope, a removably sealed inlet in said container above said filter medium for establishing communication of untreated substance into said container for passage to said medium, and a removably sealed outlet in said container above the working level of said medium and leading from said filter medium for establishing a communication with said outlet conduit for passing purified substance to said outlet conduit, said container being otherwise imperforate.

3. A refill cartridge for use in a filter having an outer casing with an inlet conduit leading thereto and a cover with an outlet conduit leading therefrom, comprising a shippable, sealed casing having inlet and outlet openings therein, but otherwise liquid tight, a filter medium disposed within said casing, said inlet and outlet openings being above the filter medium, a removable seal closing the inlet opening, a liquid communication being established between the filter medium in said casing and said inlet conduit upon removal of said seal, a removable seal closing said outlet opening, said outlet opening being attachable to said outlet conduit in said cover upon removal of the last mentioned seal to support said casing in said casing and to establish a liquid communication from said filter medium to said outlet conduit.

HERBERT L. DICK.
CHAUNCEY B. OLIVER.